United States Patent
Kim et al.

(10) Patent No.: US 7,570,335 B2
(45) Date of Patent: Aug. 4, 2009

(54) IN-PLANE SWITCHING LIQUID CRYSTAL DISPLAY DEVICE AND METHOD

(75) Inventors: Jin-Ho Kim, Seoul (KR); Sung-O Moon, Busan (KR)

(73) Assignee: LG Display Co., Ltd., Seoul (KR)

(*) Notice: Subject to any disclaimer, the term of this patent is extended or adjusted under 35 U.S.C. 154(b) by 300 days.

(21) Appl. No.: 11/239,002

(22) Filed: Sep. 30, 2005

(65) Prior Publication Data

US 2006/0274248 A1    Dec. 7, 2006

(30) Foreign Application Priority Data

Jun. 1, 2005  (KR) .............. 10-2005-0046745

(51) Int. Cl.
   *G02F 1/1343*  (2006.01)
(52) U.S. Cl. ............. 349/141; 349/96; 349/117; 349/118; 349/119; 349/129; 349/130
(58) Field of Classification Search ............ 349/96, 349/106, 141, 117–119, 129–130
See application file for complete search history.

(56) References Cited

U.S. PATENT DOCUMENTS

| | | | |
|---|---|---|---|
| 7,164,457 B2 * | 1/2007 | Kim et al. ............... 349/117 |
| 7,221,419 B2 * | 5/2007 | Iijima ........................ 349/114 |
| 2003/0156235 A1 * | 8/2003 | Kuzuhara et al. .......... 349/96 |
| 2004/0090578 A1 * | 5/2004 | Chang et al. ............... 349/117 |
| 2004/0125303 A1 * | 7/2004 | Chung ........................ 349/141 |
| 2004/0180149 A1 * | 9/2004 | Shibue et al. ............... 428/1.1 |
| 2006/0055853 A1 * | 3/2006 | Murakami et al. ......... 349/117 |

FOREIGN PATENT DOCUMENTS

| | | | |
|---|---|---|---|
| CN | 1499265 A | | 5/2004 |
| EP | 01160591 A1 | | 12/2001 |
| JP | 05-038517 | * | 2/1993 |
| JP | 2003-207621 | * | 7/2003 |
| JP | 2004-004642 | * | 1/2004 |
| WO | WO 2004/011970 A1 | | 2/2004 |

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

An in-plane switching liquid crystal display device includes a first substrate, a second substrate spaced apart from the first substrate, a liquid crystal layer between the first and second substrates, a first polarizer at an outer surface of the first substrate, the first polarizer including a first polarization film and first inner and outer supporting film at both sides of the first polarization film, the first inner supporting film adjacent to the first substrate and having a retardation within a range of about −10 nm to about +10 nm, and a second polarizer at an outer surface of the second substrate, the second polarizer including a second polarization film and second inner and outer supporting film at both sides of the second polarization film, the second inner supporting film adjacent to the second substrate.

23 Claims, 7 Drawing Sheets

IN-PLANE SWITCHING LIQUID CRYSTAL DISPLAY DEVICE AND METHOD

The present invention claims the benefit of Korean Patent Application No. 2005-0046745 filed on Jun. 1, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to an in-plane switching liquid crystal display (IPS-LCD) device and method.

2. Discussion of the Related Art

Liquid crystal display (LCD) devices use the optical anisotropy and polarization properties of liquid crystal molecules to produce an image. Liquid crystal molecules have a definite alignment as a result of their long, thin shapes and are arranged to have initial pretilt angles. The alignment direction can be controlled by applying an electric field. Specifically, variations in an applied electric field influence the alignment of the liquid crystal molecules. Due to the optical anisotropy, the refraction of incident light depends on the alignment direction of the liquid crystal molecules. Thus, by properly controlling the applied electric field, an image that has a desired brightness can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images.

In general, a liquid crystal display (LCD) device includes two substrates, which are spaced apart and face each other, and a liquid crystal layer interposed between the two substrates. Each of the substrates includes an electrode, and the electrodes of each substrate also face each other. A voltage is applied to each electrode, and an electric field is induced between the electrodes. An arrangement of the liquid crystal molecules is changed by varying the intensity of the electric field.

However, since the electrodes are positioned on the two substrates, respectively, the electric field induced between the electrodes is perpendicular to the lower and upper substrates. Accordingly, the related art LCD devices have a narrow viewing angle because of the longitudinal electric field.

In order to solve the problem of narrow viewing angle, in-plane switching liquid crystal display (IPS-LCD) devices have been proposed. An IPS-LCD device includes a pixel electrode and a common electrode on the same substrate.

FIG. 1 is a plan view illustrating one sub-pixel of an array substrate for an in-plane switching liquid crystal display (IPS-LCD) device according to the related art.

In FIG. 1, a gate line 14 is formed on a substrate 10 along a horizontal direction in the context of the figure. A data line 30 is formed on the substrate 10 along a vertical direction in the context of the figure. The gate line 14 and the data line 30 cross each other to define a pixel region P. A common line 16 is spaced apart from and parallel to the gate line 14. A thin film transistor T is formed at a crossing portion of the gate line 14 and the data line 30. The thin film transistor T includes a gate electrode 12, a semiconductor layer 22, a source electrode 26, and a drain electrode 28.

In the pixel region P, a pixel electrode 32 is formed. The pixel electrode 32 is connected to the drain electrode 28 and includes portions parallel to the data line 30. In the pixel region P, a common electrode 18 is also formed. The common electrode 18 includes parts extending from the common line 16 along the vertical direction in the context of the figure. The parts of the common electrode 18 alternate with the portions of the pixel electrode 32.

Accordingly, in the IPS-LCD device, liquid crystal molecules are driven by a horizontal electric field induced between the pixel electrode 32 and the common electrode 18 to thereby produce an image.

FIG. 2 is a cross-sectional view illustrating an IPS-LCD device according to the related art. The IPS-LCD device includes an array substrate and a color filter substrate with a liquid crystal layer interposed therebetween.

More particularly, as shown in FIG. 2, a pixel region P is defined on a first substrate 10. A thin film transistor T, as a switching element, is formed in the pixel region P on the first substrate 10, and a common electrode 18 and a pixel electrode 32 are also formed in the pixel region P. The thin film transistor T includes a gate electrode 12, a semiconductor layer 22, a source electrode 26, and a drain electrode 28. The common electrode 18 includes a plurality of parts, and the pixel electrode 32 includes a plurality of portions, which alternate with the plurality of parts of the common electrode 18.

A second substrate 40 is spaced apart from the first substrate 10. A black matrix 42 is formed on an inner surface of the second substrate 40, i.e., a surface facing the first substrate 10. The black matrix 42 corresponds to the thin film transistor T. A color filter layer is also formed on the inner surface of the second substrate 40, and the color filter layer includes three color filters of red 44a, green 44b, and blue (not shown). The color filter layer corresponds to the pixel region P.

A liquid crystal layer 50 is interposed between the first substrate 10 and the second substrate 40. Liquid crystal molecules of the liquid crystal layer 50 are arranged parallel to the first and second substrates 10 and 40.

A lower polarizer 62 is disposed at an outer surface of the first substrate 10 opposite to the thin film transistor T, the pixel electrode 32 and the common electrode 18. An upper polarizer 64 is disposed at an outer surface of the second substrate 40. A light transmissive axis of the lower polarizer 62 is perpendicular to a light transmissive axis of the upper polarizer 64.

FIG. 3 is a schematic view illustrating optical elements changing polarization of light in FIG. 2.

As shown in FIG. 3, the lower polarizer 62, the liquid crystal layer 50, and the upper polarizer 64 change polarization of light.

Each of the lower polarizer 62 and the upper polarizer 64 includes a poly-vinyl alcohol (PVA) film 62a or 64a as a linear polarization element. Each of the lower polarizer 62 and the upper polarizer 64 further includes inner and outer tri-acetyl cellulose (TAC) films 62b and 62c or 64b and 64c at both sides of the PVA film 62a or 64a. The inner TAC film 62b or 64b is adjacent to the liquid crystal layer 50.

In the above IPS-LCD device, a rubbing direction of the liquid crystal layer 50 is parallel to the light transmissive axis of the lower polarizer 62 and is perpendicular to the light transmissive axis of the upper polarizer 64 to thereby provide normally black mode. That is, when a voltage is not applied, a light passing through the lower polarizer 62 is not changed in its polarization while transmitting the liquid crystal layer 50 and reaches the upper polarizer 64. Since the light transmissive axis of the upper polarizer 64 is perpendicular to the light transmissive axis of the lower polarizer 62, the light does not pass through the upper polarizer 64. Therefore, a black image is produced.

In the normally black mode, while a full black image is observed when a liquid crystal panel is seen from the front, a color shift occurs when the liquid crystal panel is seen from the side. This is because the inner TAC film 62b or 64b has a Z-direction retardation, that is, $R_{th}=\{(n_x+n_y)/2-n_z\}\times d$, wherein $n_x$, $n_y$ and $n_z$ are X, Y, and Z-directional refractive indexes of the inner TAC film 62b or 64b, respectively, and d is a thickness of the inner TAC film 62b or 64b, wherein the X-direction and the Y-direction are perpendicular to each other and are parallel to the liquid crystal panel, and the Z-direction is perpendicular to the liquid crystal panel. For example, the inner TAC film 62b or 64b may have retardation of about −40 nm. Accordingly, the color shift occurs much stronger as the viewing angle is far from the front.

FIG. 4 is a view illustrating a Poincare sphere showing polarization states of light passing through the optical elements of FIG. 3. The Poincare sphere of FIG. 4 represents polarization states of light when a liquid crystal panel including the optical elements of FIG. 3 is seen from the side.

Generally, in the Poincare sphere, points on the equator A1 indicate linearly polarized light, and the upper and lower poles A2 and A3 represent left and right-handed circularly polarized light, respectively. Points on the upper hemisphere B1 represent left-handed elliptically polarized light, and points on the lower hemisphere B2 represent right-handed elliptically polarized light.

When two points on the equator A1 are symmetrical with respect to the center O of the Poincare sphere, the two points have opposite polarization properties. That is, if an arbitrarily chosen point on the equator A1 designates horizontal polarization, the diametrically opposite point designates vertical polarization.

In FIG. 4, the point S1 on the equator A1 designates a polarization state of a linearly polarized light passing through the PVA film 62a of the lower polarizer 62 when the liquid crystal panel is seen from the front. However, when the liquid crystal panel is seen from the side, the polarization state of the linearly polarized light passing through the PVA film 62a of the lower polarizer 62 is observed on the point S2 on the equator A1. Then, the linearly polarized light passes through the inner TAC film 62b of the lower polarizer 62. If the inner TAC film 62b of the lower polarizer 62 does not have retardation, the polarization state of the linearly polarized light does not change on the point S2 after passing through the inner TAC film 62b of the lower polarizer 62. However, since the inner TAC film 62b of the lower polarizer 62 has retardation of about −40 nm, the linearly polarized light passing through the inner TAC film 62b of the lower polarizer 62 is converted into a right-handed elliptically polarized light on the point S3. The right-handed elliptically polarized light is converted into a left-handed elliptically polarized light on the point S4 after passing through the liquid crystal layer 50 because the liquid crystal layer 50 has retardation Δn·d. Next, the left-handed elliptically polarized light passes through the inner TAC film 64b of the upper polarizer 64. The light passing through the inner TAC film 64b of the upper polarizer 64 has the polarization state on the point S5 around the equator A1 and then reaches the PVA film 64a of the upper polarizer 64.

On the points S4 and S5, the polarization states for R, G, and B lights still are not coincident at one point. Accordingly, a color shift occurs. The color shift increases as the viewing angle is far from the front.

FIG. 5 is a chromatic diagram showing color shift properties of an IPS-LCD device according to the related art. In FIG. 5, colors are widely distributed.

This means that the color shift occurs in a wide range of viewing angles. The color shift is caused by the inner TAC films 62b and 64b of the lower and upper polarizers 62 and 64 having the retardation of about −40 nm. The color shift has bad effect on a wide viewing angle of the IPS-LCD device.

SUMMARY OF THE INVENTION

Accordingly, the present invention is directed to an in-plane switching liquid crystal display device that substantially obviates one or more problems due to limitations and disadvantages of the related art.

An advantage of the present invention is to provide an in-plane switching liquid crystal display device having improved viewing angle properties.

Another advantage of the present invention is to provide an in-plane switching liquid crystal display device in which a color shift is prevented or minimized.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device includes a first substrate, a second substrate spaced apart from the first substrate, a liquid crystal layer between the first and second substrates, a first polarizer at an outer surface of the first substrate, the first polarizer including a first polarization film and first inner and outer supporting film at both sides of the first polarization film, the first inner supporting film adjacent to the first substrate and having a retardation within a range of about −10 nm to about +10 nm, and a second polarizer at an outer surface of the second substrate, the second polarizer including a second polarization film and second inner and outer supporting film at both sides of the second polarization film, the second inner supporting film adjacent to the second substrate.

In another aspect of the present invention, a method of manufacturing a liquid crystal display device comprises providing first and second substrates; providing liquid crystal between the first and second substrates; providing a first polarizer on an outer surface of the first substrate, the first polarizer including a first polarization film and first inner and outer supporting films, at opposite sides of the first polarization film, the first inner supporting film adjacent to the first substrate and having a retardation value within a range of about −10 nm to about +10 nm; and providing a second polarizer on an outer surface of the second substrate, the second polarizer including a second polarization film and second inner and outer supporting films at opposite sides of the second polarization film, the second inner polarization film adjacent to the second substrate.

In a further aspect of the present invention, an in-plane switching liquid crystal display device, comprises a first substrate; a second substrate spaced apart from the first substrate; a liquid crystal layer between the first and second substrates; a first polarizer at an outer surface of the first substrate, the first polarizer including a first polarization film and first inner and outer supporting films at opposite sides of the first polarization film, the first inner supporting film adjacent to the first substrate; and a second polarizer at an outer surface of the second substrate, the second polarizer including a second polarization film and second inner and outer supporting films, at opposite sides of the second polarization film, the second inner supporting film adjacent to the second substrate wherein a color shift from viewing the in-plane switching liquid crystal display device is minimized to a range of about 0.2-0.3 for "x" coordinate and 0.2-0.3 for "y" coordinate in the International Commission on Illumination (hereinafter "CIE") chromaticity diagram.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, an example of which is illustrated in the accompanying drawings.

Figure 1:
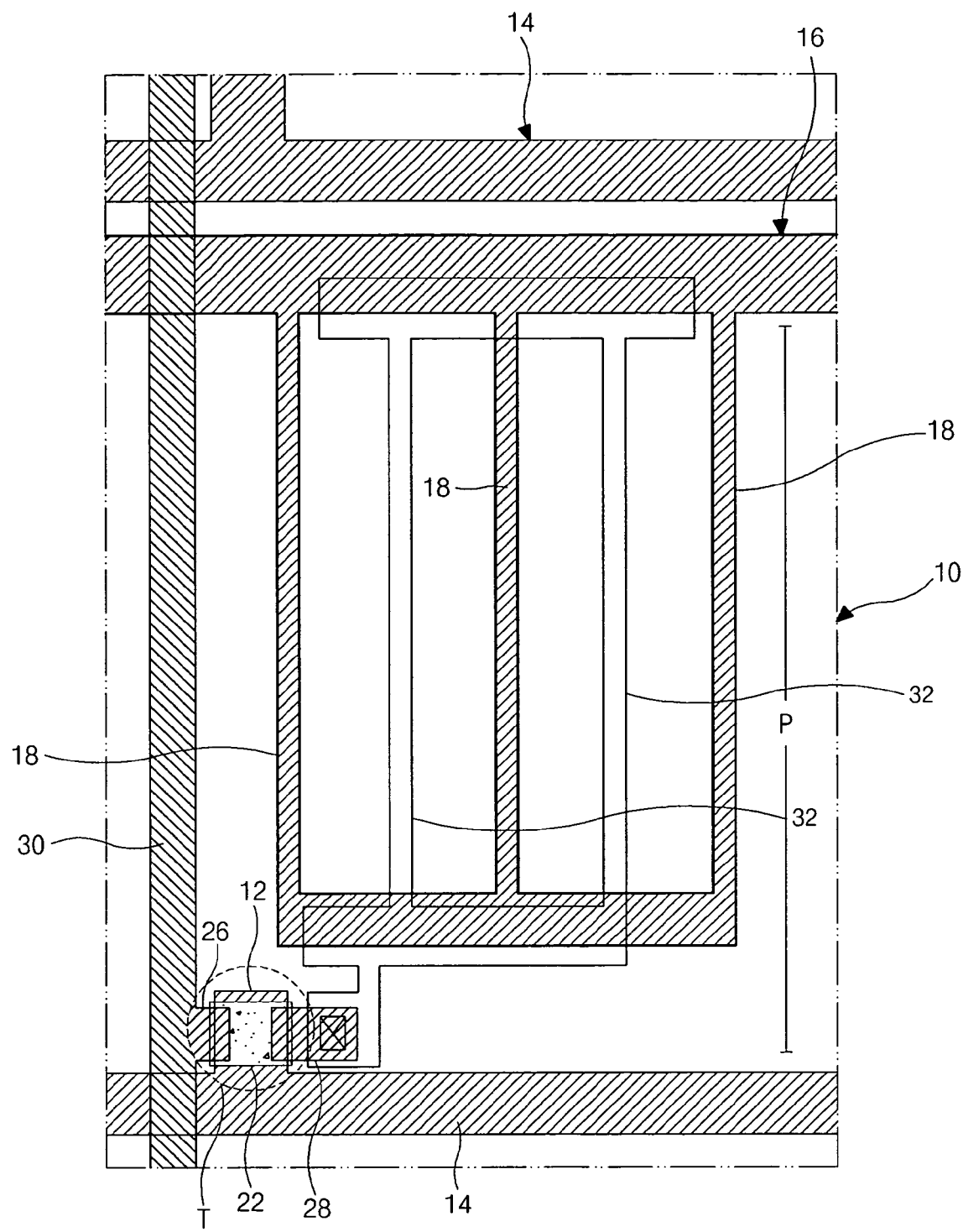
FIG. 1 is a plan view illustrating one sub-pixel of an array substrate for an in-plane switching liquid crystal display (IPS-LCD) device according to the related art.
Figure 2:
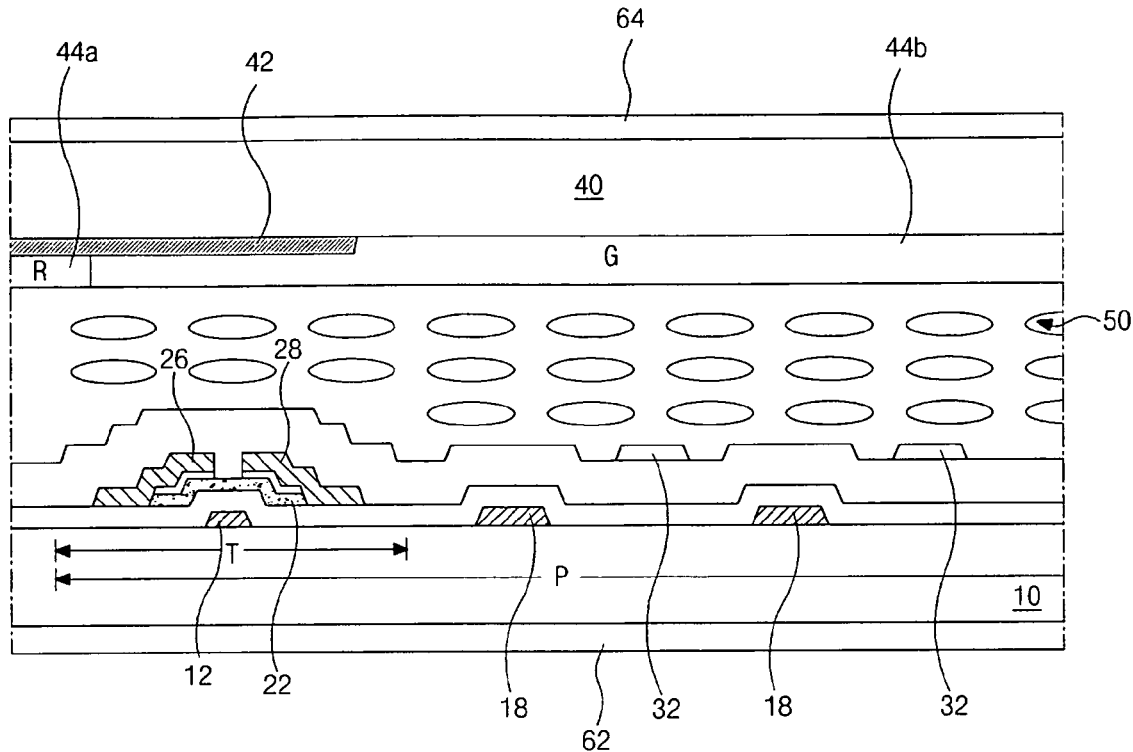
FIG. 2 is a cross-sectional view illustrating an IPS-LCD device according to the related art.
Figure 3:
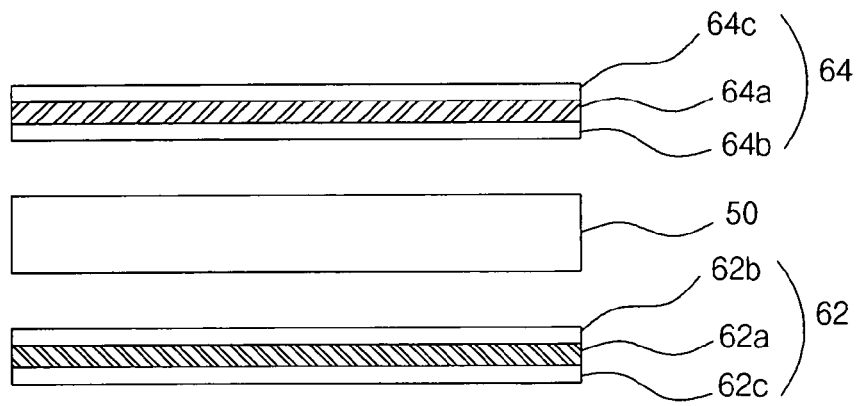
FIG. 3 is a schematic view illustrating optical elements changing polarization of light in FIG. 2.
Figure 4:
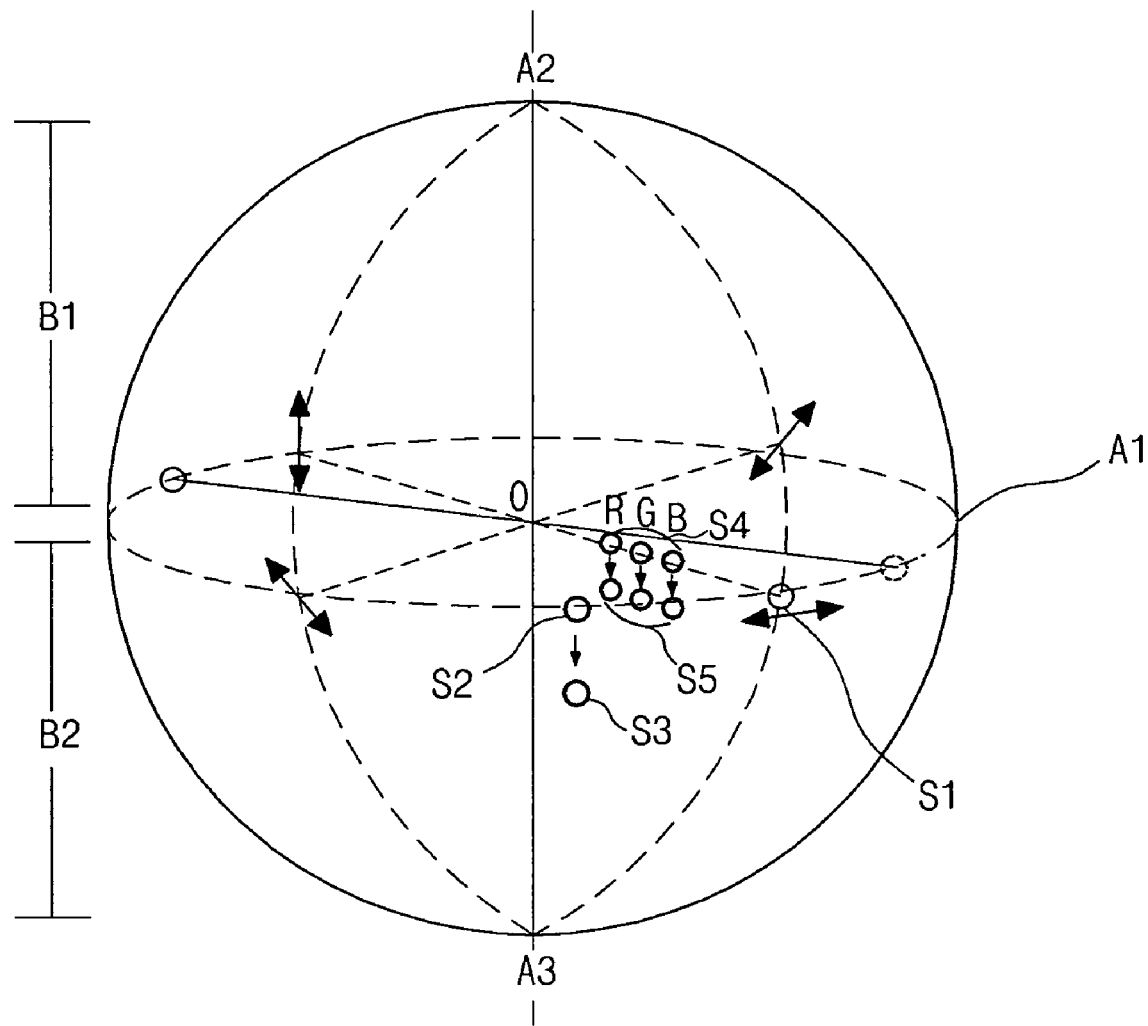
FIG. 4 is a view illustrating a Poincare sphere showing polarization states of light passing through the optical elements of FIG. 3.
Figure 5:
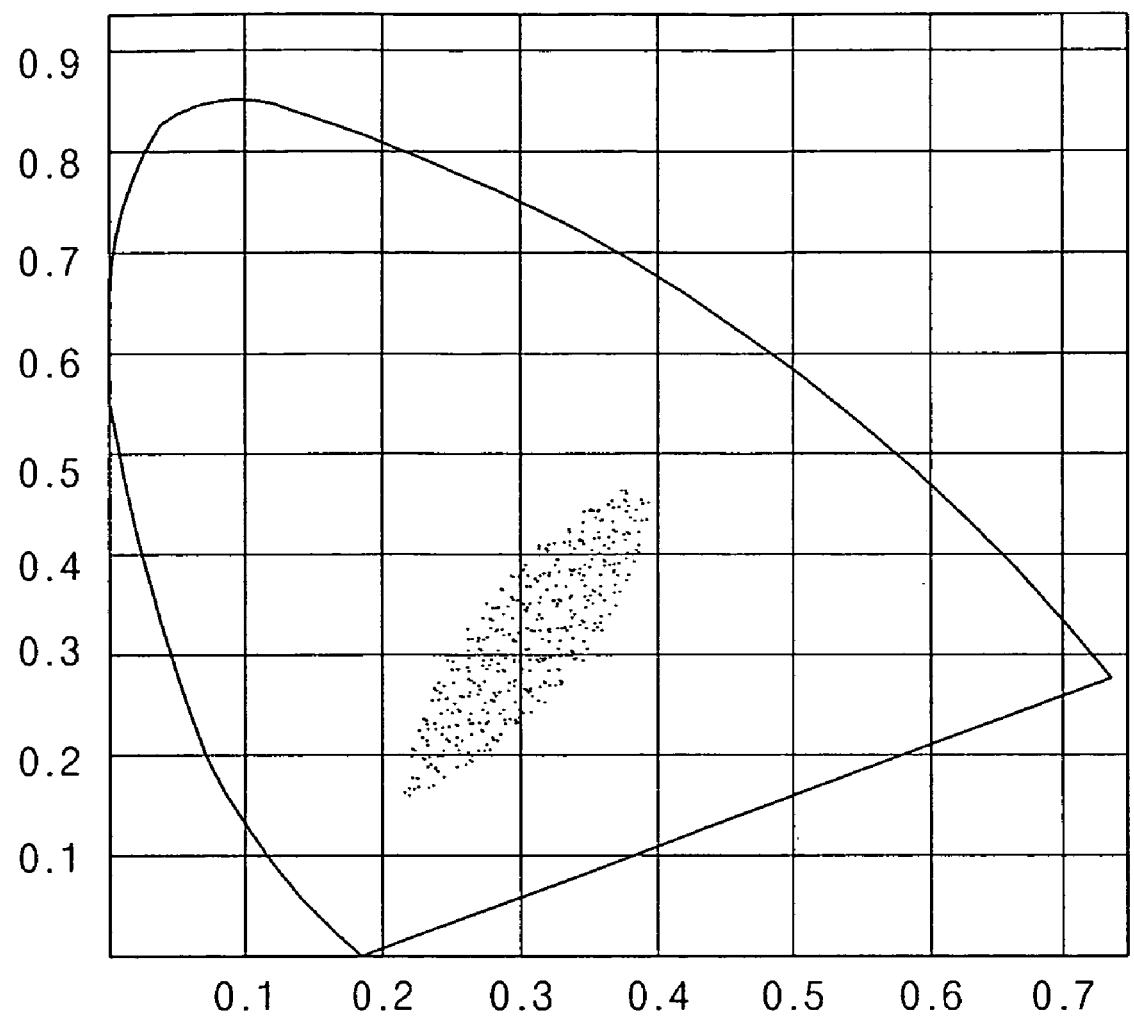
FIG. 5 is a chromatic diagram showing color shift properties of an IPS-LCD device according to the related art.
Figure 6:
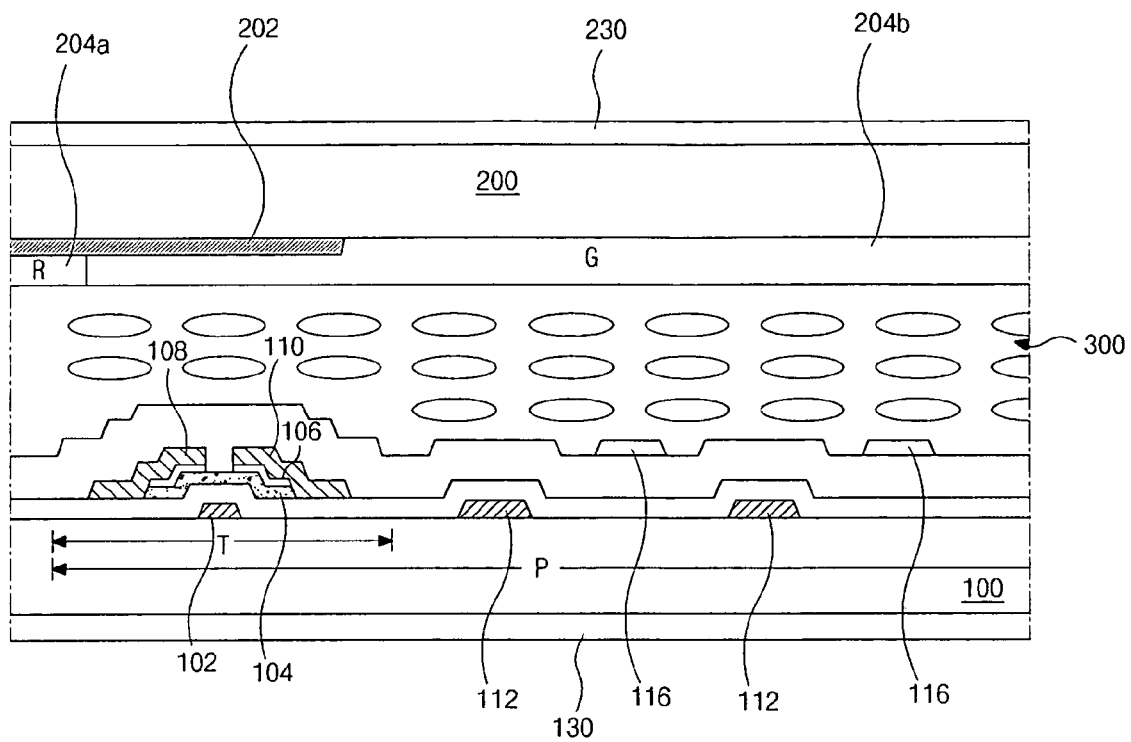
FIG. 6 is a cross-sectional view illustrating an IPS-LCD device according to an embodiment of the present invention.

FIG. 6 is a cross-sectional view illustrating an IPS-LCD device according to an embodiment of the present invention. The IPS-LCD device includes an array substrate and a color filter substrate attached and spaced apart from each other. The IPS-LCD device further includes a liquid crystal layer interposed between the array substrate and the color filter substrate.

In FIG. 6, a pixel region P is defined on a first substrate 100. Although not shown in the figure, a plurality of gate lines and a plurality of data lines are formed on the first substrate 100 and cross each other to thereby define each pixel region P.

A thin film transistor T, as a switching element, is formed at each crossing point of the gate and data lines and is disposed in the pixel region P on the first substrate 100. The thin film transistor T includes a gate electrode 102, an active layer 104, an ohmic contact layer 106, a source electrode 108, and a drain electrode 110. A common electrode 112 and a pixel electrode 116 are also formed in the pixel region P on the first substrate 100. The common electrode 112 includes a plurality of parts, and the pixel electrode 116 includes a plurality of portions, which alternate with the plurality of parts of the common electrode 112. The common electrode 112 is formed of the same material and on the same layer as the gate electrode 102. The pixel electrode 116 is formed of a transparent conductive material such as indium tin oxide or the like, and although not shown in the figure, the pixel electrode 116 is connected to the drain electrode 110. The pixel electrode 116 may be formed of the same material and on the same layer as the source and drain electrodes 108 and 110. The common electrode 112 may be formed of a transparent conductive material. Although not shown, the common electrode 112 and the pixel electrode 116 may substantially be parallel to the data lines.

A second substrate 200 is spaced apart from the first substrate 100. A black matrix 202 is formed on an inner surface of the second substrate 200, i.e., a surface facing the first substrate 100. The black matrix 202 corresponds to the thin film transistor T. A color filter layer is also formed on the inner surface of the second substrate 200, and the color filter layer includes three color filters of red 204a, green 204b, and blue (not shown). The color filter layer corresponds to the pixel region P.

The first substrate 100 including the thin film transistor T, the pixel electrode 116 and the common electrode 112 may be referred to as the array substrate. The second substrate 200 including the black matrix 202 and the color filter layer may be referred to as the color filter substrate.

A liquid crystal layer 300 is interposed between the first substrate 100 and the second substrate 200. Liquid crystal molecules of the liquid crystal layer 300 are arranged parallel to the first and second substrates 100 and 200. Although not shown in the figure, alignment layers arranging the liquid crystal molecules of the liquid crystal layer 300 are formed over the first and second substrates 100 and 200, respectively.

A lower polarizer 130 is disposed at an outer surface of the first substrate 100 opposing to the thin film transistor T, the pixel electrode 116 and the common electrode 112. An upper polarizer 230 is disposed at an outer surface of the second substrate 200. A light transmissive axis of the lower polarizer 130 is substantially perpendicular to a light transmissive axis of the upper polarizer 230. A rubbing direction of the liquid crystal layer 300 is substantially parallel to the light transmissive axis of the lower polarizer 130 to thereby provide a normally black mode.

Here, each of the lower polarizer 130 and the upper polarizer 230 includes a supporting film adjacent to the liquid crystal layer 300, and the supporting film has low retardation within a range of about −10 nm to about +10 nm. The supporting film may include one of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

Figure 7:
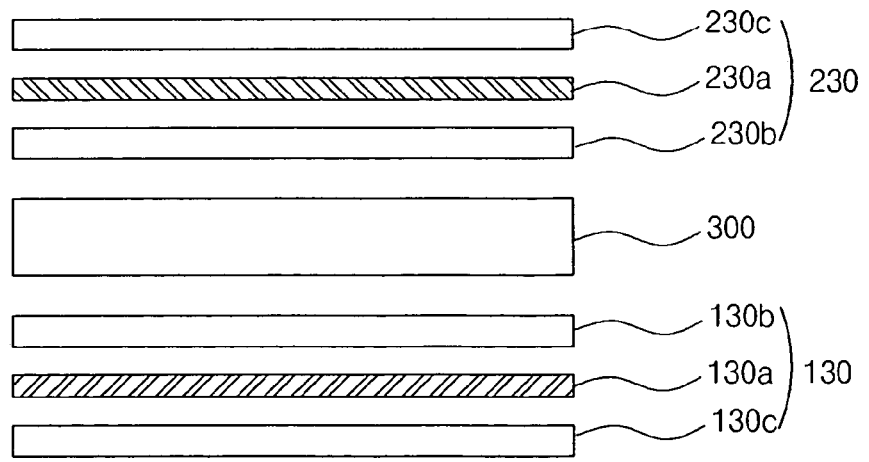
FIG. 7 is a schematic view illustrating optical elements changing polarization of light in the IPS-LCD device of FIG. 6.

FIG. 7 is a schematic view illustrating optical elements changing polarization of light in the IPS-LCD device of FIG. 6.

As illustrated in FIG. 7, the lower polarizer 130, the liquid crystal layer 300, and the upper polarizer 230 change polarization of light.

The lower polarizer 130 includes a first polarization film 130a and first inner and outer supporting films 130b and 130c at opposite sides of the first polarization film 130a. The first inner supporting film 130b is adjacent to the liquid crystal layer 300. The upper polarizer 230 includes a second polarization film 230a and second inner and outer supporting films 230b and 230c at opposite sides of the second polarization film 230a. The second inner supporting film 230b is adjacent to the liquid crystal layer 300. The first and second polarization films 130a and 230a are linear polarization elements and may be a poly-vinyl alcohol (PVA) film or the like. The first inner and outer supporting films 130b and 130c and the second inner and outer supporting films 230b and 230c may be a tri-acetyl cellulose (TAC) film or the like. The first inner and outer supporting films 130b and 130c and the second inner and outer supporting films 230b and 230c may include one of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer. The first and second inner supporting films 130b and 230b have low retardation value within a range of about −10 nm to about +10 nm. Therefore, the color shift does not occur or is minimized and viewing angles are improved.

Figure 8:
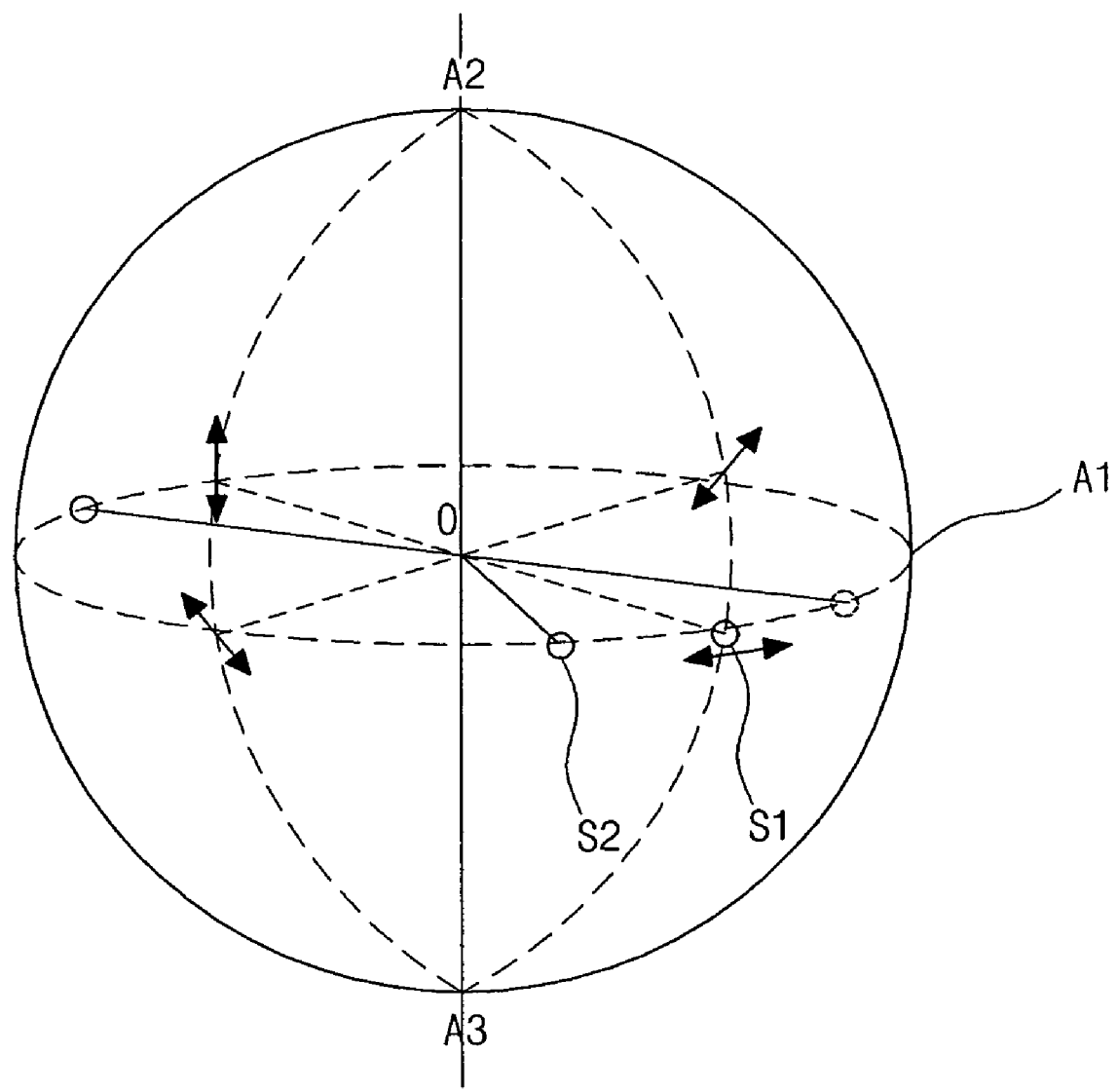
FIG. 8 is a view illustrating a Poincare sphere showing polarization states of light passing through the optical elements of FIG. 7.

FIG. 8 is a view illustrating a Poincare sphere showing polarization states of light passing through the optical elements of FIG. 7. The Poincare sphere of FIG. 8 represents polarization states of light when a liquid crystal panel including the optical elements of FIG. 7 is seen from the side.

In FIG. 8, the point S1 on the equator A1 designates a polarization state of a linearly polarized light passing through the first polarization film 130a of the lower polarizer 130 when the liquid crystal panel is seen from the front. However, when the liquid crystal panel is seen from the side, the polarization state of the linearly polarized light passing through the first polarization film 130a is observed on the point S2 on the equator A1. Then, the linearly polarized light passes through the first inner supporting film 130b. Since the first inner supporting film 130b does not have retardation (or has relatively low retardation), the polarization state of the linearly polarized light does not change on the point S2 after passing through the first inner supporting film 130b. Next, the light passing through the first inner supporting film 130b transmits the liquid crystal layer 300. Because the polarization state of the light passing through the first inner supporting film 130b does not change, the liquid crystal layer 300 does not have an effect on the polarization state of the light. In addition, since the second inner supporting film 230b also has low retardation within a range of about −10 nm to about +10 nmn, the light passing through liquid crystal layer 300 transmits the second inner supporting film 230b and reaches the second polarization film 230a. The light reaching the second polarization film 230a still has the polarization state on the point S2 or a point very near S2. Here, the polarization states for R, G, and B lights are coincident at one point when passing through the optical elements. Accordingly, the color shift does not occur or is minimized.

Figure 9:
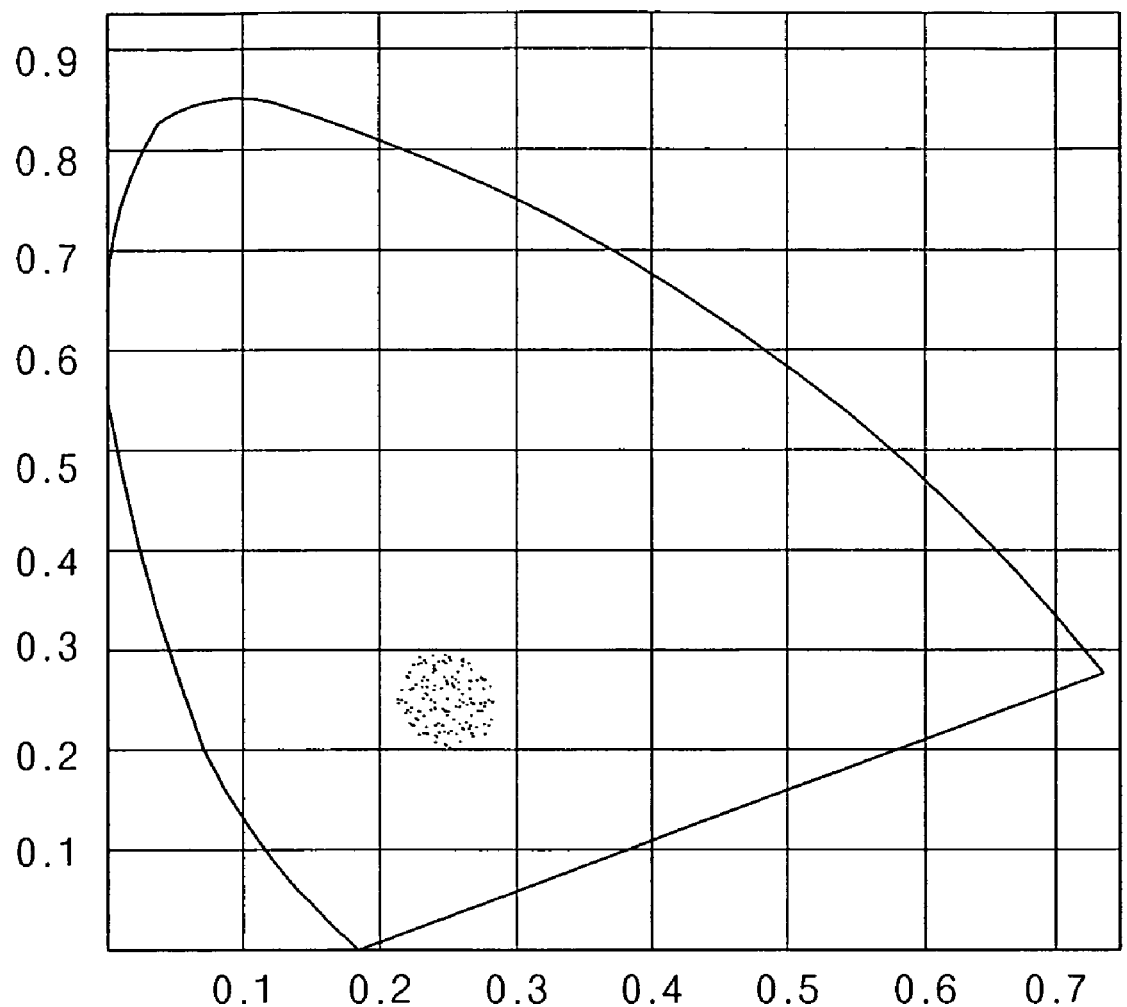
FIG. 9 is a chromatic diagram showing color shift properties of an IPS-LCD device according to the embodiment of the present invention.

FIG. 9 is a chromatic diagram showing color shift properties of an IPS-LCD device according to the embodiment of the present invention. In FIG. 9, colors are narrowly distributed. In particular, using the CIE chromaticity diagram, the color shift is limited to about 0.2 to 0.3 in the "x" coordinate and about 0.2 to 0.3 in the "y" coordinate. This means that the color shift does not occur or is minimized.

In the present invention, the first and second inner supporting films have low retardation within a range of about −10 nm to about +10 nm, but the second inner supporting film of the upper polarizer may have retardation smaller than about −10 nm or greater than about +10 nm.

Therefore, in the IPS-LCD device according to the present invention, since relatively little color shift occurs, viewing angle properties are improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
    a first substrate;
    a second substrate spaced apart from the first substrate;
    a liquid crystal layer between the first and second substrates;
    a first polarizer at an outer surface of the first substrate, the first polarizer including a first polarization film and first inner and outer supporting films at opposite sides of the first polarization film, the first inner supporting film adjacent to the first substrate and having a retardation value within a range of about −10 nm to about +10 nm; and
    a second polarizer at an outer surface of the second substrate, the second polarizer including a second polarization film and second inner and outer supporting films, at opposite sides of the second polarization film, the second inner supporting film adjacent to the second substrate,
    wherein a color shift from viewing the in-plane switching liquid crystal display device is minimized to a range of about 0.2-0.3 for "x" coordinate and 0.2-0.3 for "y" coordinate in the International Commission on Illumination (CIE) chromaticity diagram.

2. The device according to claim 1, wherein the second inner supporting film has a retardation value within a range of about −10 nm to about +10 nm.

3. The device according to claim 2, wherein the second inner supporting film includes a material selected from the group consisting of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbomene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

4. The device according to claim 1, wherein the liquid crystal layer has a rubbing direction substantially parallel to the first light transmissive axis.

5. The device according to claim 1, wherein the first polarizer has a first light transmissive axis substantially perpendicular to a second light transmissive axis of the second polarizer.

6. The device according to claim 1, wherein the first and second polarization films include poly-vinyl alcohol.

7. The device according to claim 1, wherein the first inner and outer supporting films and the second inner and outer supporting films include tri-acetyl cellulose.

8. The device according to claim 1, wherein light passes from the first polarizer to the second polarizer.

9. The device according to claim 1, further comprising a thin film transistor, a pixel electrode and a common electrode on the first substrate.

10. The device according to claim 9, further comprising a color filter layer and a black matrix on the second substrate.

11. The device according to claim 1, wherein the first inner supporting film includes a material selected from the group consisting of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbomene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

12. A method of manufacturing a liquid crystal display device comprising:
providing first and second substrates;
providing liquid crystal between the first and second substrates;
providing a first polarizer on an outer surface of the first substrate, the first polarizer including a first polarization film and first inner and outer supporting films, at opposite sides of the first polarization film, the first inner supporting film adjacent to the first substrate and having a retardation value within a range of about −10 nm to about +10 nm; and
providing a second polarizer on an outer surface of the second substrate, the second polarizer including a second polarization film and second inner and outer supporting films at opposite sides of the second polarization film, the second inner polarization film adjacent to the second substrate,
wherein a color shift from viewing the in-plane switching liquid crystal display device is minimized to a range of about 0.2-0.3 for "x" coordinate and 0.2-0.3 for "y" coordinate in the Intematinal Commission on Illumination (CIE) chromaticity diagram.

13. The method according to claim 12, wherein the second inner supporting film has a retardation value within a range of about −10 nm to about +10 nm.

14. The method according to claim 13, wherein the second inner supporting film includes a material selected from the group consisting of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

15. The method according to claim 12, wherein the liquid crystal layer has a rubbing direction substantially parallel to the first light transmissive axis.

16. The method according to claim 12, wherein the first polarizer has a first light transmissive axis substantially perpendicular to a second light transmissive axis of the second polarizer.

17. The method according to claim 12, wherein the first and second polarization films include poly-vinyl alcohol.

18. The method according to claim 12, wherein the first inner and outer supporting films and the second inner and outer supporting films include tri-acetyl cellulose.

19. The method according to claim 12, wherein light passes from the first polarizer to the second polarizer.

20. The method according to claim 12, further comprising a step of forming a thin film transistor, a pixel electrode and a common electrode on the first substrate.

21. The method according to claim 20, further comprising a step of forming a color filter layer and a black matrix on the second substrate.

22. The method according to claim 12, wherein the first inner supporting film includes a material selected from the group consisting of polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbomene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

23. An in-plane switching liquid crystal display device, comprising:
a first substrate;
a second substrate spaced apart from the first substrate;
a liquid crystal layer between the first and second substrates;
a first polarizer at an outer surface of the first substrate, the first polarizer including a first polarization film and first inner and outer supporting films at opposite sides of the first polarization film, the first inner supporting film adjacent to the first substrate; and
a second polarizer at an outer surface of the second substrate, the second polarizer including a second polarization film and second inner and outer supporting films, at opposite sides of the second polarization film, the second inner supporting film adjacent to the second substrate, wherein a color shift from viewing the in-plane switching liquid crystal display device is minimized to a range of about 0.2-0.3 for "x" coordinate and 0.2-0.3 for "y" coordinate in the International Commission on Illumination (CIE) chromaticity diagram.

* * * * *